United States Patent [19]

Lütze et al.

[11] Patent Number: 4,881,754
[45] Date of Patent: Nov. 21, 1989

[54] SAFETY DEVICE FOR THE OCCUPANT OF THE CENTRAL REAR SEAT POSITION IN A MOTOR VEHICLE

[75] Inventors: Hans Lütze, Aidlingen; Falk Zeidler, Sindelfingen, both of Fed. Rep. of Germany

[73] Assignee: Mercedes-Benz AG, Stuttgart, Fed. Rep. of Germany

[21] Appl. No.: 237,759

[22] Filed: Aug. 29, 1988

[30] Foreign Application Priority Data

Sep. 3, 1987 [DE] Fed. Rep. of Germany ....... 3729392

[51] Int. Cl.⁴ ............................................. B60R 21/08
[52] U.S. Cl. .................................... 280/728; 280/734; 280/735; 297/411
[58] Field of Search ............... 280/728, 734, 735, 752, 280/753; 297/485, 391, 411, 417, 115

[56] References Cited

U.S. PATENT DOCUMENTS

| | | | |
|---|---|---|---|
| 3,420,572 | 1/1969 | Bisland | 280/735 |
| 3,617,073 | 11/1971 | Landsman | 280/734 |
| 3,632,132 | 1/1972 | Richardson | 280/728 |
| 3,672,699 | 6/1972 | DeWindt | 280/735 |
| 3,810,653 | 5/1974 | Schiesterl et al. | 280/735 |
| 4,577,905 | 3/1986 | Grant | 297/417 |

FOREIGN PATENT DOCUMENTS

| | | |
|---|---|---|
| 2058608 | 6/1972 | Fed. Rep. of Germany . |
| 1680081 | 12/1975 | Fed. Rep. of Germany . |
| 7917997 | 9/1979 | Fed. Rep. of Germany . |
| 3729392 | 12/1988 | Fed. Rep. of Germany . |
| 1327063 | 8/1973 | United Kingdom . |

*Primary Examiner*—Richard A. Bertsch
*Attorney, Agent, or Firm*—Barnes & Thornburg

[57] ABSTRACT

In a safety device for the occupant of the central rear seat position in a motor vehicle the arm-rest present between the front seats is used for his or her effective protection in the case of a frontal collision. A pivoting drive, which engages the arm-rest, pivots the arm-rest out of its position extending approximately horizontally in the longitudinal direction of the vehicle towards the front seat back-rest in the case of a crash. The pivoting drive is connected to a sensor which detects a vehicle deceleration, and which trips the pivoting drive to erect the arm-rest when a prescribed value of the integrated vehicle deceleration is exceeded.

15 Claims, 1 Drawing Sheet

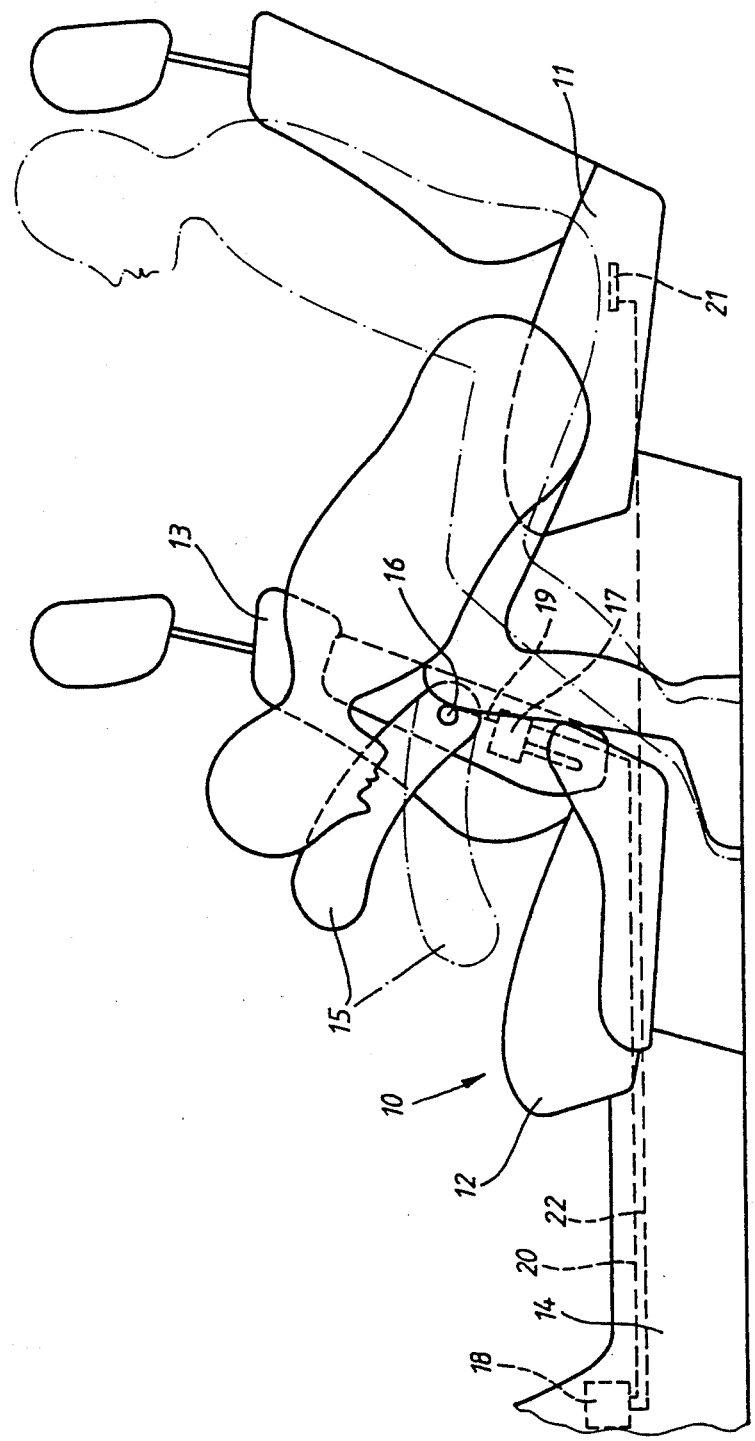

SAFETY DEVICE FOR THE OCCUPANT OF THE CENTRAL REAR SEAT POSITION IN A MOTOR VEHICLE

BACKGROUND AND SUMMARY OF THE INVENTION

The invention relates to a safety device for the occupant of the central rear seat position in a motor vehicle.

Rear passengers who sit on the central section of the rear bench seat are in greater danger in the case of accidents than the occupants in other seat positions, in spite of the prescribed pelvic belt, because in the case of a severe frontal collision of the vehicle, for example, they swing through with their head between the front seat rests and can strike parts of the fittings hard in a kind of jack-knife effect.

To prevent this, in a known safety device of the type initially described in German Published Unexamined Application No. (DE-OS) 2,058,608, two inflatable gas cushions, so-called air bags, known per se, are arranged in the top region of the back-rests of both the front seats beneath the head-rests so that in the inflated state the mutually facing surfaces of the two gas cushions touch each other. At least the upper region of the gap between the back-rests of the front seats is virtually closed by this means, and protection of the rear passenger in the central rear seat position against plunging through is achieved. The gas cushions are inflated abruptly in the case of a crash, in known manner, the case of a crash being signaled by a deceleration sensor.

Known seat configurations of the front seats provide a pivotable arm-rest, also called a central arm-rest, between the front seats. Thus in the front seats known from German Pat. No. (DE-PS) 1,680,081 the arm-rests are fastened on the rear section of a box-shaped intermediate cushion which is inserted into a storage tray arranged on the transmission tunnel. In the case of other front seats the arm-rest is retained pivotably on the back-rests on one of the two front seats.

An underlying object of the invention is to develop a safety device of the type initially stated, including the arm-rest between the front seats, which effectively protects the rear passenger occupying the central rear seat position from serious injury in the case of a crash.

The object is achieved according to the invention, in a safety device of the above noted type by providing a pivoting drive to pivot the arm rest into a position cushioning the back seat passenger movement in the event of a predetermined vehicle deceleration.

In the safety device according to the invention, in the case of a crash the upholstered arm-rest is erected by sensor control and pivoted into a favorable position for the rear passenger secured by the pelvic belt in the central rear seat position in the case of a collision. By this means, on the one hand the head of the rear passenger who is thrown forward is intercepted favorably, and on the other hand his thorax is prevented from plunging between the back-rests of the front seats, so that a rotation of the thorax associated therewith is also eliminated. Injuries even of a minor nature can be totally prevented by a largely energy-dissipating construction of the arm-rest, as a large-area element for example. The arm-rest is fastened stably in its pivot axis and is preferably locked in its collision position by the pivoting drive, so that it cannot yield as a unit when struck by the head.

A favorable collision situation for the occupant's head and thorax is achieved by an additional air bag on the arm-rest, which is tripped simultaneously with its pivoting or just afterwards, because the inflating air bag moves to meet the thorax.

An occupation detector which senses the occupation of the central rear seat position according to certain preferred embodiments can cause the safety device to react only when this seat is actually occupied and it is therefore necessary to protect the rear passenger sitting there.

Pyrotechnical drives, such as are known from so-called belt tensioners for safety belts, are particularly suitable as pivoting drives; they trip virtually without delay and drive a traction cable which is connected to the arm-rest at high speed.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows diagrammatically an interior of a vehicle with front seat and rear seat, the central seat surface of which is occupied by a passenger, and a safety device for this rear passenger, constructed according to a preferred embodiment of the invention.

DETAILED DESCRIPTION OF THE DRAWINGS

The passenger compartment of a motor car contains, as known, two front seats 10, of which only the passenger seat is shown in the drawing, and a central rear seat position 11 constructed as a region of a bench seat. Two further seat positions, which are provided beside the rear seat position 11, are equipped with customary three-point safety belts, whereas only a pelvic belt is present at the central rear seat position 11. The front seats 10, which each consists of seat cushion 12 and back-rest 13, are slidable in the longitudinal direction of the vehicle and arranged at a mutual transverse interval, which is dictated substantially by the transmission tunnel 14 extending longitudinally and continuously through the center of the passenger compartment. Due to this transverse interval a relatively wide gap exists between the back-rests 13, being wide enough for the head and also part of the thorax of an occupant of the central rear seat position 11 swinging forward to plunge through in the case of a crash. An arm-rest 15 is arranged on the back-rest 13 of one of the two front seats 10 about a horizontally aligned pivot axis 16 retained in the back-rest 13, which abuts a stop in one limit position (shown by chain-dotted lines in the drawing) and occupies a substantially horizontal alignment to support the forearm of one of the two passengers on the front seats 10.

The arm-rest 15 simultaneously forms part of the safety device for the rear passenger sitting behind it in the central rear seat position 11, which further comprises a pivoting drive 17 to pivot the arm-rest 15 and a deceleration sensor 18 which trips the pivoting drive 17, and which detects a vehicle deceleration and starts the pivoting drive 17 when a prescribed value of the integrated vehicle deceleration is exceeded. The pivoting drive 17 is constructed as a pyrotechnical drive device, such as is known from belt tensioners in safety belts and described in German Published Unexamined Application No. DE-OS 2,258,063, for example. In the present case the piston, not shown, drivable by a propellant charge in a cylinder, is connected by a traction cable 19 to the arm-rest 15, and when advanced pivots the latter clockwise towards the back-rest 13 of the front seat 10. The propellant charge is ignited electrically, namely by an ignition trigger integrated in the deceleration sensor 18, when the output signal of the deceleration sensor 18 is converted into an electrical ignition signal when the prescribed value of the integrated vehicle deceleration is exceeded and fed through an electrical ignition line 20, shown by a dash line, to the igniter of the propellant charge. The piston is locked in its advanced limit position, so the arm-rest 15 is secured against return pivoting when the rear passenger's head strikes it.

In order to prevent an unnecessary tripping of the safety device in the case of an unoccupied central rear seat position 11, the latter is equipped with an occupation detector 21, which detects the occupation of this seat position. The occupation detector 21 may react to pressure, for example, when a person has sat down on the seat surface of the central rear seat position 11, and deliver a corresponding electrical occupation signal through an electrical connecting line 22 to the ignition trigger integrated in the deceleration sensor 18. The ignition trigger is equipped with an electrical blocking device, a logical circuit, for example, which only effects the generation of an ignition signal in response to an output signal of the deceleration sensor 18 when the occupation signal is emitted by the occupation detector 21.

In order to prevent minor injuries when striking the head against the arm-rest 15, the latter is either of upholstered construction, preferably as a large-area energy-dissipating impact element, or provided with an impact cushion, a so-called air bag, which is inflated abruptly in the case of a crash, fills the space between the back rests 13 of the front seats 10, and optionally comes to meet the rear occupant's thorax as it swings forward. The inflation of the impact cushion in this case is tripped by the ignition signal which is fed to the propellant charge of the pivoting drive 17, whilst the gases liberated during the burning of the propellant charge may be used for the inflation.

The principle of operation of the safety device is as follows:

In a normal case the rear passenger seated on the seat surface of the central rear seat position 11 occupies the position shown by chain-dotted lines in the drawing. He exerts, by his body weight, a pressure upon the occupation detector 21, which delivers an occupation signal continuously to the ignition trigger integrated with the deceleration sensor 18. The arm-rest 15 occupies its chain-dotted position in the drawing, in which it serves for the occasional support of the forearm of one of the two passengers in the front seats 10. The rear passenger on the seat surface of the rear seat position 11 is secured by a pelvic belt.

Upon a frontal collision of the vehicle the deceleration sensor 18 generates at its output a sensor signal which, due to the existing occupation signal of the occupation detector 21, passes to the ignition trigger. The latter generates an ignition signal which passes through the electrical ignition line 20 to the ignition device of the pivoting drive 17. The propellant charge is ignited and the piston driven by the resulting gases pivots the arm-rest 15 through the traction cable 19. The arm-rest 15 moves into its erect position shown by solid lines in the drawing. The rear passenger secured by the pelvic belt is thrown forward by the frontal collision of the vehicle, as shown by solid lines in the drawing. His head then plunges through between the back-rests 13 of the two front seats 10 and is intercepted gently by the upholstered surface of the arm-rest 15 which pivots to meet him. Any further plunging of the rear passenger's head or even of his thorax is thereby prevented. By appropriate dimensioning of the pivoting drive 17, the arm-rest 15 assumes a favorable position for intercepting the head at the moment of the collision and therefore creates an advantageous situation for the rear occupant's head, so the risk of injury is largely prevented.

The invention is not restricted to the exemplary embodiment described above; for example, the arm-rest 15 may not be fastened by its pivot axis 16 to the back-rest 13 of a front seat 10, but be arranged by means of a separate fastening element to the transmission tunnel 14, as is described in German Pat. No. (DE-PS) 1,680,081, for example.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Safety device for the occupant of the central rear seat position in a motor vehicle, having an upholstered arm-rest arranged between the front seats which is constructed pivotable about a horizontal pivot axis aligned transversely to the longitudinal direction of the vehicle, wherein a pivoting drive engages the arm-rest in order to pivot the latter out of a position extending horizontally in the longitudinal direction of the vehicle towards the front seat back-rests, and wherein the pivoting drive is connected to a sensor which detects a vehicle deceleration and which generates an output signal which trips the pivoting drive to erect the arm-rest when a prescribed value of the integrated vehicle deceleration is exceeded.

2. Device according to claim 1, wherein the pivoting drive is constructed so that it pivots the arm-rest through a constant pivotal stroke into a prescribed end position and maintain it there locked against return pivoting.

3. Device according to claim 1, wherein the upholstery of the arm-rest is of energy-dissipating construction.

4. Device according to claim 2, wherein the upholstery of the arm-rest is of energy-dissipating construction.

5. Device according to claim 1, wherein the deceleration sensor of a belt tensioning device, for safety belts of the vehicle occupants, present in the vehicle, is used as the sensor.

6. Device according to claim 2, wherein the deceleration sensor of a belt tensioning device, for safety belts of the vehicle occupants, present in the vehicle, is used as the sensor.

7. Device according to claim 1, wherein the pivoting drive exhibits a traction cable which engages the arm-rest and a preferably pyrotechnical drive element connected to the traction cable.

8. Device according to claim 1, wherein a blocking device, which is interposed in the connection between sensor and the pivoting drive, is controlled by an occupation detector which senses the occupation of the central rear seat position so that the connection between sensor and pivoting drive is blocked when the central rear seat position is unoccupied.

9. Device according to claim 8, wherein the occupation detector is arranged in the seat surface of the central rear seat position and when under load generates a release signal which cancels the blocking action of the blocking device.

10. Device according to claim 1, wherein the pivot axis of the arm-rest is retained on at least one front seat back-rest.

11. Device according to claim 1, wherein the pivot axis of the arm-rest is retained independently of the front seat back-rest.

12. Device according to claim 10, wherein the pivoting drive is integrated into the front seat back-rest which houses the pivot axis.

13. Device according to claim 11, wherein the pivoting drive is integrated into the transmission tunnel which houses the pivot axis.

14. Device according to claim 1, wherein the arm-rest is provided with an impact cushion, the inflation of which is tripped by the output signal of the sensor in the case of a crash, and which in the inflated state fills at least the space between the front seat back-rests.

15. Device according to claim 1, wherein the arm-rest is provided with an impact cushion, the inflation of which is tripped by the output signal of the sensor in the case of a crash, and which in the inflated state fills at least the space between the front seat back-rests.

* * * * *